(12) United States Patent
Lu

(10) Patent No.: US 7,307,670 B2
(45) Date of Patent: Dec. 11, 2007

(54) BAD EDITING DETECTION DEVICE

(75) Inventor: Zhi-Ming Lu, Sikou Township, Chiayi County (TW)

(73) Assignee: Sunplus Technology Co., Ltd. (TW)

( * ) Notice: Subject to any disclaimer, the term of this patent is extended or adjusted under 35 U.S.C. 154(b) by 540 days.

(21) Appl. No.: 10/935,075

(22) Filed: Sep. 8, 2004

(65) Prior Publication Data

US 2005/0128360 A1    Jun. 16, 2005

(30) Foreign Application Priority Data

Dec. 12, 2003  (TW) .............................. 92135284 A

(51) Int. Cl.
*H04N 7/01*      (2006.01)
*H04N 11/00*    (2006.01)

(52) U.S. Cl. ..................... 348/701; 348/96; 348/448; 348/604

(58) Field of Classification Search ............... 348/558, 348/700, 701, 96, 448, 452, 441, 722, 449, 348/604; 375/240.12; 386/52
See application file for complete search history.

(56) References Cited

U.S. PATENT DOCUMENTS

| | | | |
|---|---|---|---|
| 4,982,280 A * | 1/1991 | Lyon et al. .................. 348/448 |
| 5,291,280 A * | 3/1994 | Faroudja et al. ........ 375/240.12 |
| 6,686,923 B2* | 2/2004 | Ji et al. ....................... 345/606 |
| 6,731,684 B1 * | 5/2004 | Wu ......................... 375/240.12 |
| 7,075,581 B1 * | 7/2006 | Ozgen et al. ................ 348/448 |
| 2003/0081677 A1* | 5/2003 | Segman ................... 375/240.13 |
| 2003/0189667 A1* | 10/2003 | Chow .......................... 348/441 |
| 2004/0130619 A1* | 7/2004 | Lin ................................ 348/96 |
| 2004/0201777 A1* | 10/2004 | Zhu et al. .................... 348/448 |

\* cited by examiner

*Primary Examiner*—Victor R. Kostak
(74) *Attorney, Agent, or Firm*—Bacon & Thomas, PLLC

(57) ABSTRACT

A bad editing detection device is provided to pre-detect a bad editing of image signal, so as to avoid zigzag effect in the television image. When the input image is from a film, instead of from a video source, the line doubler performs a de-interlace for the film signal to increase the vertical resolution of the television signal. The detection device detects a bad editing before the image signal is played and adjusts the de-interlace of the line doubler to avoid zigzag effect.

4 Claims, 6 Drawing Sheets

| | film segment A | | | | | | | | film segment B | | | | | | |
|---|---|---|---|---|---|---|---|---|---|---|---|---|---|---|---|
| field | 1 | 2 | 3 | 4 | 5 | 6 | 7 | 8 | 9 | 10 | 11 | 12 | 13 | 14 | 15 | 16 |
| frame | a | a | a | b | b | c | c | c | d | e | e | f | f | f | g | g |
| frame motion data | 0 | 1 | 1 | 1 | 1 | 0 | 1 | 1 | 1 | 1 | 1 | 0 | 1 | 1 | 1 | 1 |

FIG. 5

BAD EDITING DETECTION DEVICE

BACKGROUND OF THE INVENTION

1. Field of the Invention

The present invention relates to a detection device and, more particularly, to a device for detecting a bad editing in image signals.

2. Description of the Related Art

Due to the bandwidth limitation, the current television signals are transmitted and displayed by an interlaced manner. As shown in FIG. 1, an image frame is generated by interlacing one even field 11, 13 and one odd field 10, 12, wherein the odd field 10, 12 contains only odd lines of the image frame, and the even field 11, 13 contains only even lines of the image frame. In order to improve the vertical resolution, next generation televisions require a line doubler to perform a frequency multiplication process to increase the vertical resolution. One of the simplest frequency multiplication processes involves directly combining two adjacent fields (an odd field and another even field) to form a progressive scan frame. However, due to a time difference between the two fields, the progressive scan frame yields zigzag patterns on moving objects in the image.

In order to avoid the above-mentioned problem, an advanced line doubler is provided with a motion detector to detect the moving objects in the image, and applies an inter-field interpolation of a de-interlaced process to the still parts of an image, and an intra-field interpolation of the de-interlaced process to the moving parts of an image.

Another frequency multiplication process is achieved by determining whether the image source is from a film. It is known that a film is formed by recording 24 frames per second. Thus, if the film is to be displayed following the NTSC television standard, the 24 frames per second must be transformed into 60 fields per second. As shown in FIG. 2, this transformation technique is known as "3:2 pull down"; in other words, two continuous frames of the film are respectively transformed into 3 fields and 2 fields. For example, a frame 14 of the film is transformed into a field 18 (an odd field), a field 19 (an even field) and a field 20 (an odd field), and a frame 15 of the film is transformed into a field 21 (an even field) and a field 22 (an odd field), and so on. Therefore, if the image source is recognized as originally from a film, a perfect output, without any zigzag effect, can be obtained by combining only the odd field and the even field originally from the same film frame, and thus the moving object can be provided with the highest possible vertical resolution.

In order to determine the type of image resource, a prior art technique utilizes frame motion data or field motion data to determine whether the image source is from a film. FIG. 3 shows a frame motion detector 31 providing frame motion data. As shown in FIG. 3, every frame motion detector 31 is used for detecting whether two continuous odd fields or even fields are identical; if they are, a "0" is outputted; if they are not, a "1" is outputted. Therefore, if the television image is from a still picture, regardless of whether the image source is from a film or a video, the frame motion detector 31 continuously outputs a sequence "00000,00000, . . . "; if the television image is from a moving video, the frame motion detector 31 continuously outputs a sequence "11111,11111, . . . "; if the television image is from a moving film, the frame motion detector 31 continuously outputs a sequence "01111, 01111, . . . ".

According to the output from the frame motion detector 31, a state transition diagram of film detection, as shown in FIG. 4, is utilized for determining whether the television image is from a film processed by 3:2 pull down. In the state transition diagram, states A~F are corresponding to the video mode, and states G~K are corresponding to the film mode. As shown in the drawings, the state A is an initial state of the state transition diagram. When the input sequence is "01111", the state will transit to state E, and a counter 41 is incremented. When the count value of the counter 41 exceeds a threshold value, the state transits from E to G, i.e., from the video mode to the film mode.

If the image is processed by 3:2 pull down, the frame motion detector 31 outputs "01111" or "0000". After the frame motion detector 31 outputs a predetermined number of the sequence "01111", the state of the state transition diagram transits from the video mode to the film mode. Under the film mode, as long as the input remains "0XXXX", the state remains in the film mode.

The prior art technique can detect whether the image resource is from a film so as to provide a perfect frequency multiplication process. However, a bad editing of the film will impair the 3:2 pull down process, which causes zigzag effect in the television image. As shown in FIG. 5, fields 1~8 are from a film segment A, and fields 9~16 are from another film segment B. Due to a bad editing in the film segment B, field 9 and the following fields are not consistent with the 3:2 pull down process. Please refer again to FIG. 4 and the state transition diagram can only determine that the image is fit to the film mode at field 11. Therefore, when the field 9 is used as a basis to generate the television image, the field 9 and the field 10 originally from different film frames are combined into one image frame, and the television image incurs zigzag effect as a result.

In order to solve the above-mentioned problem, U.S. Pat. No 6,201,577 granted to Peter D. Swartz for a "Film source video detection" discloses a method of detecting bad editing on current television image. The method notifies a film detector to leave the film mode when there is a bad editing detected, so as to avoid combining two fields from different frames into an image frame. However, because the detection is performed on the current television image, when the bad editing is detected, the line doubler has already outputted an image frame with zigzag effect.

Therefore, it is desirable to provide a bad editing detection device for video signal to mitigate and/or obviate the aforementioned problems.

SUMMARY OF THE INVENTION

An objective of the present invention is to provide a bad editing detection device to overcome the aforementioned problems.

Another objective of the present invention is to provide a bad editing detection device that can pre-detect bad editing of image signal to avoid zigzag effect in the television image.

In order to achieve the above-mentioned objective, the bad editing detection device of the present invention includes first to fourth buffers for respectively storing a first field, a second field, a third field and a fourth field, wherein the second field is a basis field for generating current output of an output frame, and the fourth field, the third field and the first field are respectively a second following field, a first following field and a previous field of the second field; a frame motion detector for determining whether the first field and the third field are identical; if they are, a "0" is outputted; otherwise, a "1" is outputted; a first counter for being reset when the frame motion detector outputs 0, and being incremented when the frame motion detector outputs 1; and a bad editing detector for determining bad editing according to the third field and the fourth field when a value of the first counter is 0, 1 or 3, and according to the third field and the second field when the value of the first counter is 2 or 4.

Other objects, advantages, and novel features of the invention will become more apparent from the following detailed description when taken in conjunction with the accompanying drawings.

BRIEF DESCRIPTION OF THE DRAWINGS

FIG. 5 is a schematic drawing of a bad editing film signal;

DETAILED DESCRIPTION OF THE PREFERRED EMBODIMENT

Figure 6:
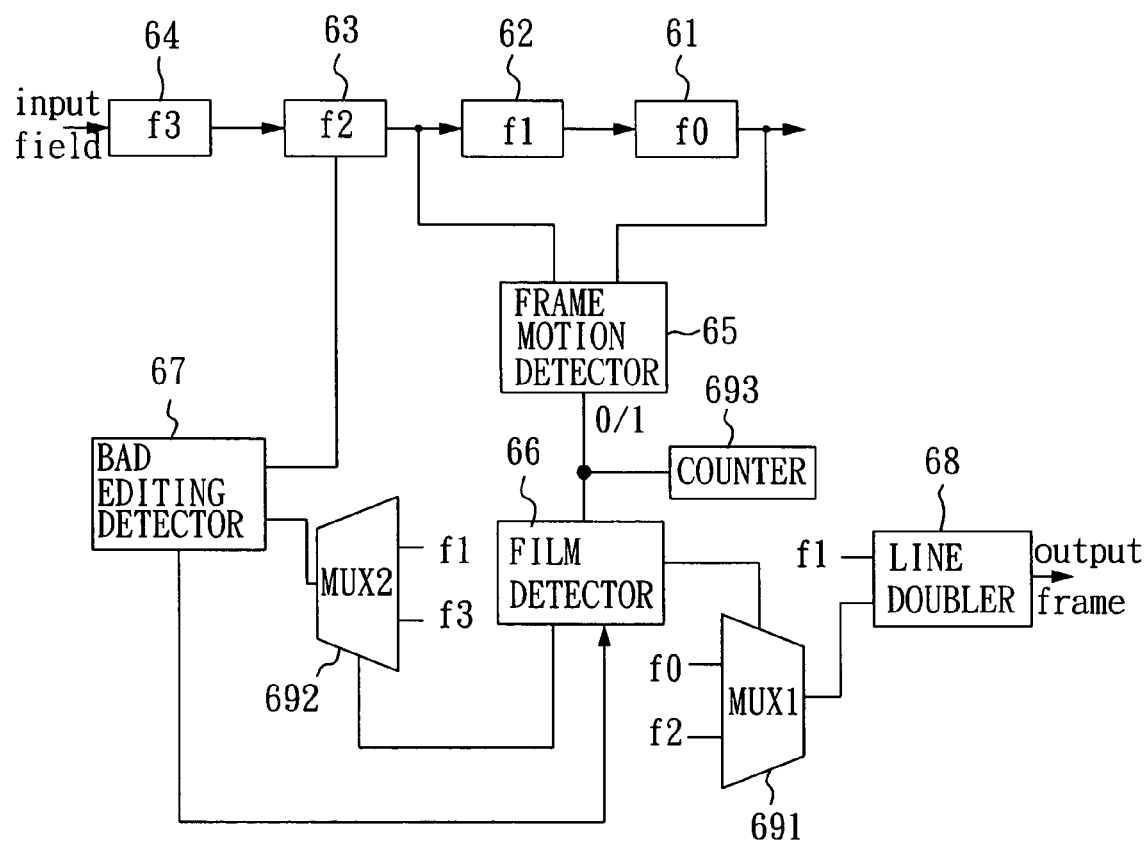
FIG. 6 is a functional block drawing of a bad editing detection device of the present invention.

FIG. 6 is a functional block drawing of a bad editing detection device in accordance with a preferred embodiment of the present invention. The bad editing detection device comprises four buffers 61, 62, 63 and 64, a frame motion detector 65, a film detector 66, a bad editing detector 67, a line doubler 68, two multiplexers 691 and 692, and a counter 693. The buffers 61, 62, 63 and 64 are provided for temporarily storing continuously inputted odd and even fields. The buffer 62 stores a field f1 to be outputted currently; the field buffers 64, 63 and 61 are used for respectively storing a second following field f3, a first following field f2 and a previous field f0 of the field f1, and the line doubler 68 generates an output frame based upon the field f1.

The frame motion detector 65 is provided for determining whether the field f0 and the field f2 are identical, i.e., whether two continuous odd fields (or even fields) are identical; if they are, a "0" is outputted; otherwise, a "1" is outputted.

Figure 1:
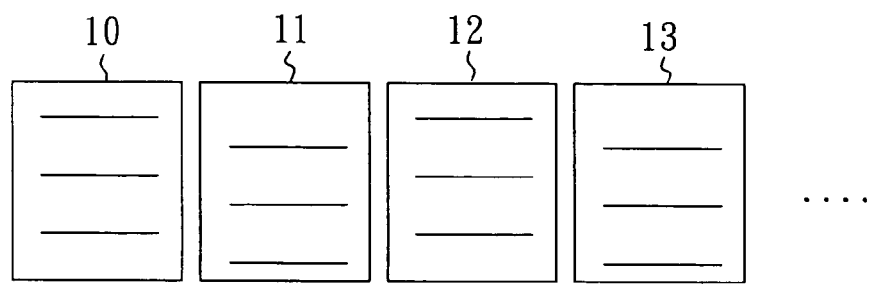
FIG. 1 is a schematic drawing of odd and even fields of an image frame.
Figure 2:
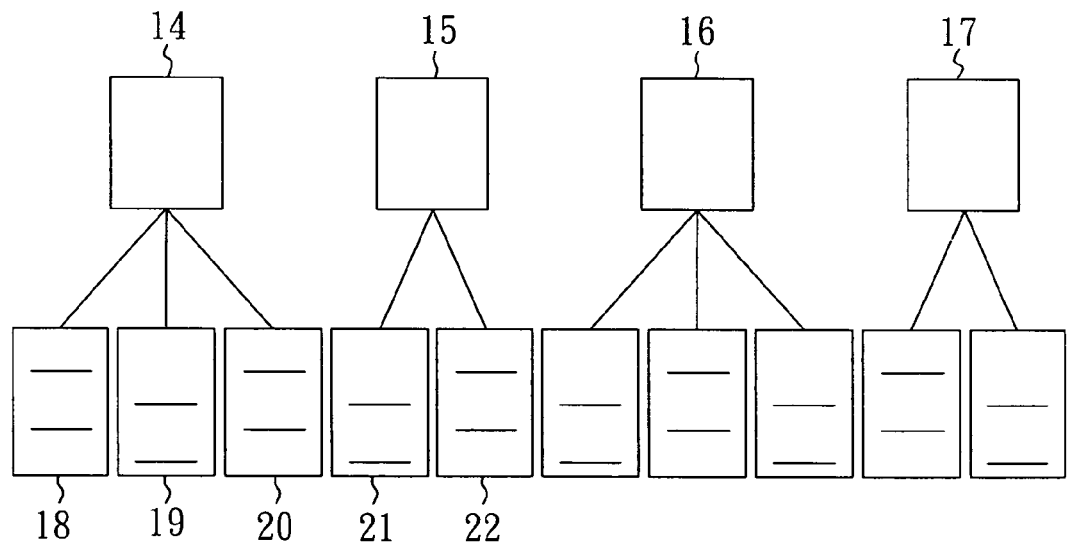
FIG. 2 is a schematic drawing of 3:2 pull down process for transforming film frames into video fields.
Figure 3:
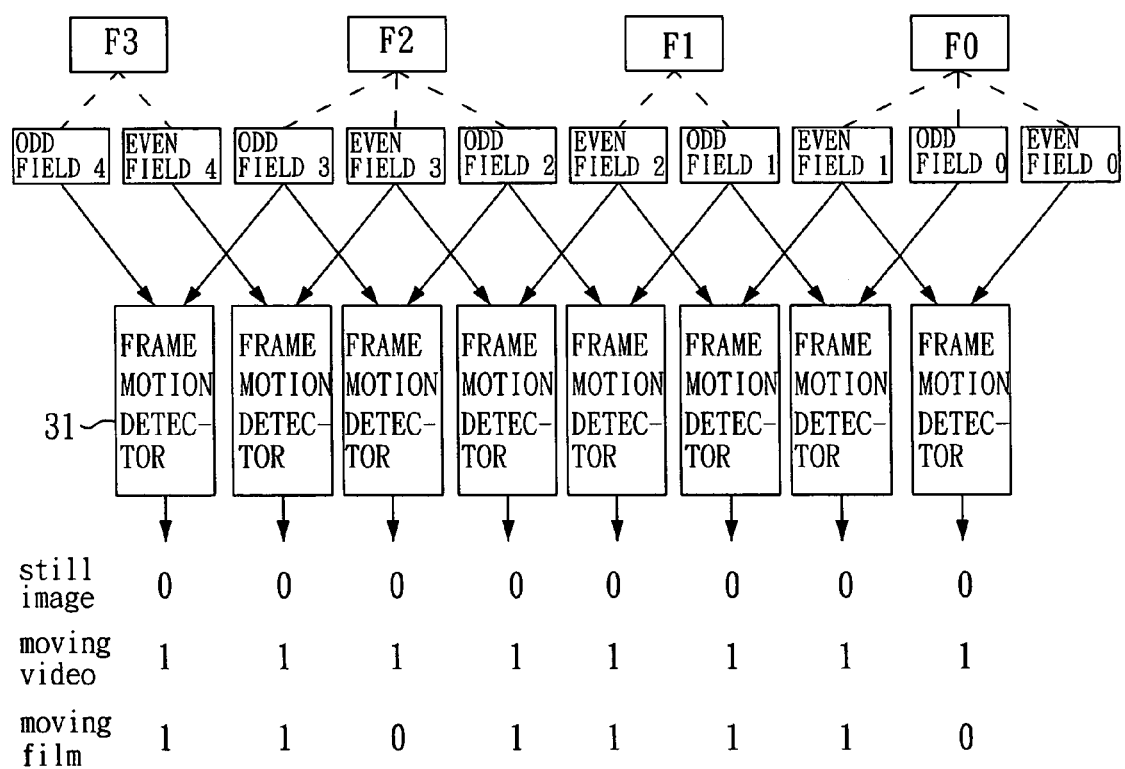
FIG. 3 is a schematic drawing of using a frame motion detector to provide frame motion data.
Figure 4:
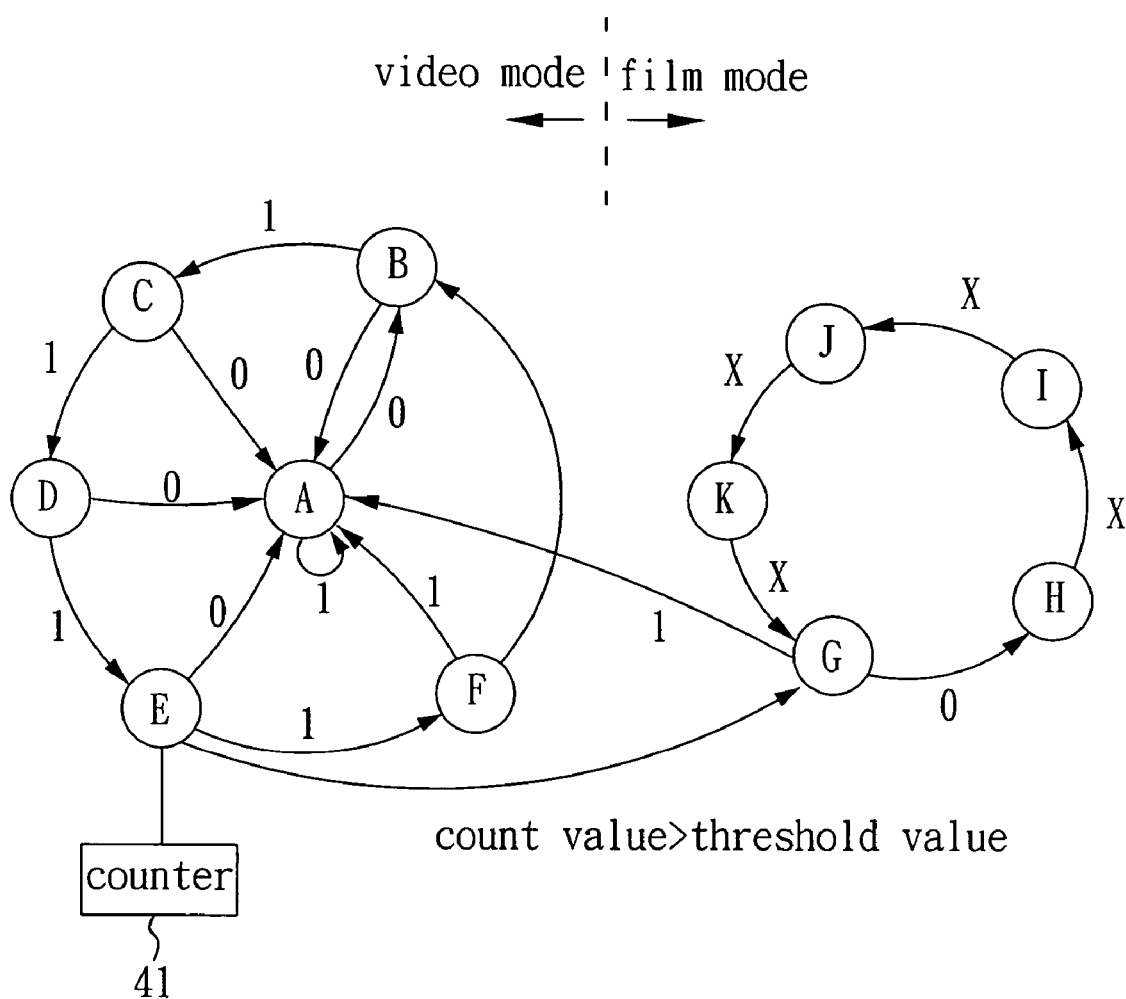
FIG. 4 is a state transition diagram of film detection.

The film detector 66 is provided for determining whether an input filed is from the film according to the output from the frame motion detector 65. The state transition diagram shown in FIG. 4 can be used for determining whether the input field is from the film or the video.

The counter 693 is reset to zero when the frame motion detector 65 outputs "0", and is incremented when the frame motion detector 65 outputs "1". When the input field is from a moving film, the frame motion detector 65 outputs a sequence "01111,01111, . . . "; therefore, the counter 693 is provided with the value of 0,1,2,3,4,0,1,2,3,4, . . . , which can be used for determining whether the field f1 and the previous field f0 or the following field f2 are combined to form one single frame.

When determining the input field is from the moving film, the film detector 66 controls the multiplexer 691 to select the field f0 or the field f2. The line doubler 68 combines the field f1 with the field f0 or the field f2 to generate one frame for output. If the value of the counter 693 is "0" (indicating that the field f1 and the following field f2 are from the same frame), the multiplexer 691 selects the field f2 to combine the field f1 with the field f2 to generate one frame for output. If the value of the counter 693 is "1" (indicating that the field f1 and the following field f2 are from the same frame), the multiplexer 691 selects the field f2 to combine the field f1 with the field f2 to generate one frame for output. If the value of the counter 693 is "2" (indicating that the field f1 and the previous field f0 are from the same frame), the multiplexer 691 selects the field f0 to combine the field f1 with the field f0 into one frame for output. If the value of the counter 693 is "3" (indicating that the field f1 and the following field f2 are from the same frame), the multiplexer 691 selects the field f2 to combine the field f1 with the field f2 into one frame for output. If the value of the counter 693 is "4" (indicating that the field f1 and the previous field f0 are from the same frame), the multiplexer 691 selects the field f0 to combine the field f1 with the field f0 into one frame for output. Accordingly, the field f1 for current output can be combined with field f0 or f2, which is from the same frame as field f1, to yield one frame.

The bad editing detector 67 is provided for determining whether there is any bad editing according to the field f2 and the fields f1 or f3, wherein the selection of f1 or f3 is achieved by controlling the multiplexer 692 when the film detector 66 determines that the input field is from a moving film. If the value of the counter 693 is "0", the multiplexer 692 selects the field f3, and the bad editing detector 67 determines whether there is a bad editing according to the field f2 and the field f3. If the value of the counter 693 is "1", the multiplexer 692 selects the field f3, and the bad editing detector 67 determines whether there is a bad editing according to the field f2 and the field f3. If the value of the counter 693 is "2", the multiplexer 692 selects the field f1, and the bad editing detector 67 determines whether there is a bad editing according to the field f2 and the field f3. If the value of the counter 693 is "3", the multiplexer 692 selects the field f3, and the bad editing detector 67 determines whether there is bad editing according to the field f2 and the field f3. If the value of the counter 693 is "4", the multiplexer 692 selects the field f1, and the bad editing detector 67 determines whether there is a bad editing according to the field f2 and the field f1.

Figure 7:
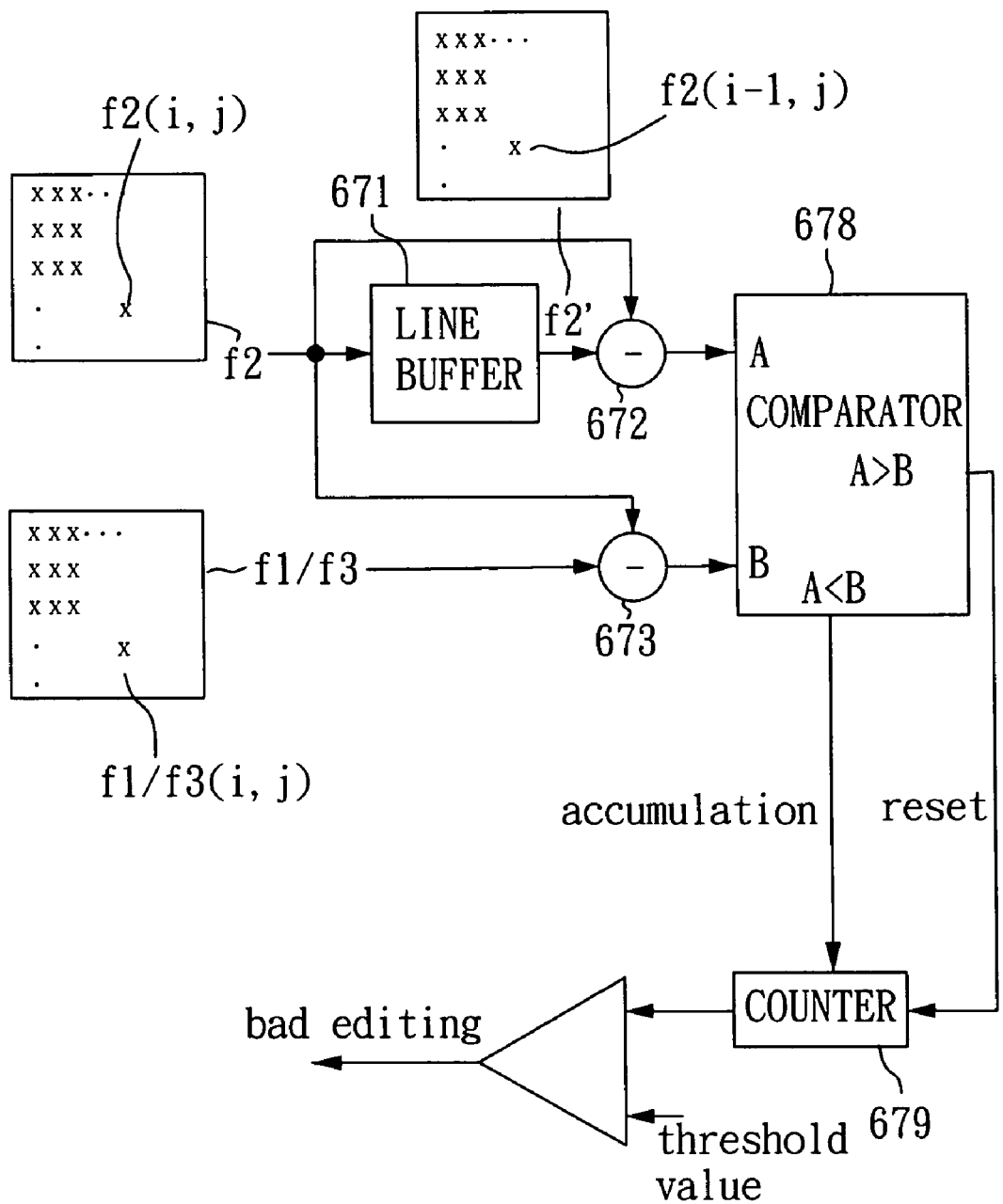
FIG. 7 is a functional block drawing of a bad editing detector.

FIG. 7 is a functional block drawing of the bad editing detector 67. The bad editing detector 67 comprises a line buffer 671, two subtractors 672 and 673, a comparator 678, and a counter 679. The field f2 (having pixels denoted as f2(i,j)) and field f1/f3 (having pixels denoted as f1/f3(i,j)) are utilized to perform a subtraction operation by the subtractor 673 to obtain a luminance difference between the field f2 and the field f1/f3. Since the field f2 and the field f1/f3 are respectively an odd field and an even field, f2(i,j) and f1/f3(i,j) are one pixel away from each other in the vertical direction, and the luminance difference between the field f2 and the field f1/f3 is termed the frame vertical energy of the field f2.

The line buffer 671 is provided for buffering a line in the field f2. Thus, pixel f2 (i,j) in the field f2 becomes pixel f2 (i−1,j) after being buffered by the line buffer 671. The buffered field f2' and the field f2 are applied to the subtractor 672 for performing a subtraction to obtain a luminance difference between the buffered field f2' and the field f2. Since f2 (i−1,j) is the buffered f2(i,j), f2(i−1,j) and f2(i,j) are two pixels away from each other in the vertical direction, and the luminance difference between the buffered field f2' and the field f2 is termed the field vertical energy of the field f2.

The frame vertical energy and the field vertical energy of the field f2 are compared with each other by the comparator 678. Since the distance (one pixel away from each other in the vertical direction) between the field f2 and the field f1/f3 is smaller than the distance (two pixels away from each other in the vertical direction) between the buffered field f2' and the field f2, the frame vertical energy is smaller than the field vertical energy. When the comparator 678 finds that the frame vertical energy exceeds the field vertical energy, it indicates that there may be a bad editing, and so the value of the counter 679 is incremented. This continues until the value of the counter 679 exceeds a threshold value, upon which a bad editing signal is outputted to notify the film detector to leave the film mode. On the other hand, when the comparator 678 finds that the frame vertical energy is smaller than the field vertical energy, the counter 679 is reset.

In view of the foregoing, it is known that the bad editing detection device of the present invention is able to detect a bad editing at the field f2 following the field f1 of current output to predict the bad editing conditions. Therefore, the film detector can leave the film mode before the output frame generates zigzag effect, and a de-interlace process of the video mode is thus employed to generate the subsequent frame, which completely avoids zigzag effect in the output image.

Although the present invention has been explained in relation to its preferred embodiment, it is to be understood that many other possible modifications and variations can be made without departing from the spirit and scope of the invention as hereinafter claimed.

What is claimed is:

1. A bad editing detection device comprising:

first to fourth buffers for respectively storing a first field, a second field, a third field and a fourth field, wherein the second field is a basis field for generating current output of an output frame, and the fourth field, the third field and the first field are respectively a second following field, a first following field and a previous field of the second field;

a frame motion detector for determining whether the first field and the third field are identical, and if affirmative, outputting 0; otherwise, outputting 1;

a first counter for being reset when the frame motion detector outputs 0, and being incremented when the frame motion detector outputs 1; and a bad editing detector for determining a bad editing according to the third field and the fourth field by detecting whether a luminance difference between the third field and the fourth field is larger than a luminance difference between the third field and a line-buffered third field when a value of the first counter is 0, 1 or 3, and determining a bad editing according to the third field and the second field by detecting whether a luminance difference between the third field and the second field is larger than a luminance difference between the third field and the line-buffered third field when the value of the first counter is 2 or 4.

2. The bad editing detection device as claimed in claim 1, wherein the bad editing detector comprises:

a first subtractor for subtracting the third field from the second or fourth field to obtain a first luminance difference between the third field and the second or fourth field;

a line buffer for buffering a line in the third field;

a second subtractor for subtracting the third field from the buffered third field to obtain a second luminance difference between the third field and the buffered third field;

a second counter; and a comparator for comparing the first luminance difference with the second luminance difference; if the first luminance difference is smaller than the second luminance difference, the second counter is reset; otherwise, the second counter is incremented;

wherein when the value of the second counter exceeds a threshold, a bad editing is detected.

3. The bad editing detection device as claimed in claim 2, further comprising a film detector, which determines whether an input image is a still image, a moving film signal or a moving video signal according to an output from the frame motion detector.

4. The bad editing detection device as claimed in claim 3, further comprising a line doubler for combining two fields into one frame for output, wherein when the film detector detects that the input image is a moving film signal, if the value of the first counter is 0, 1 or 3, the line doubler combines the second field and the third field into one frame for output; and if the value of the first counter is 2 or 4, the line doubler combines the second field and the first field into one frame for output.

* * * * *